United States Patent
Patel et al.

(10) Patent No.: US 10,539,200 B2
(45) Date of Patent: Jan. 21, 2020

(54) SOUND-BASED BRAKE WEAR DETECTION FOR VEHICLE BRAKING SYSTEMS

(71) Applicant: Robert Bosch GmbH, Stuttgart (DE)

(72) Inventors: Ketan Patel, Pittsburgh, PA (US); Richard T. Nesbitt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 15/717,390

(22) Filed: Sep. 27, 2017

(65) Prior Publication Data
US 2019/0093722 A1    Mar. 28, 2019

(51) Int. Cl.
F16D 66/02    (2006.01)
B60T 17/22    (2006.01)
H04R 3/00     (2006.01)
B60T 8/171    (2006.01)
H04R 29/00    (2006.01)

(52) U.S. Cl.
CPC ............ *F16D 66/028* (2013.01); *B60T 8/171* (2013.01); *B60T 17/221* (2013.01); *H04R 3/00* (2013.01); *H04R 29/00* (2013.01); *H04R 2420/07* (2013.01)

(58) Field of Classification Search
CPC .. F16D 66/028; F16D 2066/006; B60T 8/171; B60T 8/885; B60T 17/221; B60T 2270/406; H04R 2420/07; H04R 3/00; H04R 29/00
See application file for complete search history.

(56) References Cited

U.S. PATENT DOCUMENTS

| | | | |
|---|---|---|---|
| 4,240,672 A | 12/1980 | Tokunaga et al. | |
| 4,266,633 A * | 5/1981 | Barabino | F16D 66/024 188/1.11 W |
| 5,586,028 A | 12/1996 | Sekine et al. | |
| 6,612,662 B2 | 9/2003 | Ohtsu | |
| 7,077,483 B2 | 7/2006 | Miyazaki | |
| 7,086,503 B2 * | 8/2006 | Miller | B60T 17/22 188/1.11 L |
| 7,472,012 B2 | 12/2008 | Tsuruhara et al. | |
| 8,563,313 B2 | 10/2013 | Srikumaran et al. | |
| 8,577,531 B2 | 11/2013 | Semsey et al. | |
| 8,874,305 B2 | 10/2014 | Dolgov et al. | |
| 8,886,412 B2 | 11/2014 | Rosol et al. | |

(Continued)

FOREIGN PATENT DOCUMENTS

DE    102015009443 A1    3/2016
EP      1970274 A2       9/2008

(Continued)

*Primary Examiner* — Nicholas Kiswanto
(74) *Attorney, Agent, or Firm* — Michael Best & Friedrich LLP

(57) ABSTRACT

Systems and methods for detecting wear in a braking system of a vehicle. The system includes a microphone and an electronic controller configured to receive an audio signal from the microphone, determine at least one sound characteristic of the audio signal, determine, based upon the at least one sound characteristic, a condition of a braking component of the braking system, generate a notification regarding the condition, and perform at least one selected from the group of sending the notification to a display for output to a user, storing the notification in a memory, and modifying operation of the vehicle.

18 Claims, 4 Drawing Sheets

(56) References Cited

U.S. PATENT DOCUMENTS

| | | | |
|---|---|---|---|
| 9,315,178 | B1 | 4/2016 | Ferguson et al. |
| 9,983,000 | B2 * | 5/2018 | Malmsheimer ......... F16D 66/02 |
| 2002/0002430 | A1 | 1/2002 | Nada |
| 2004/0186648 | A1 | 9/2004 | Zheng et al. |
| 2008/0234964 | A1 | 9/2008 | Miyasaka et al. |
| 2011/0012720 | A1 * | 1/2011 | Hirschfeld ........... G07C 5/0808 |
| | | | 340/439 |
| 2014/0136643 | A1 | 5/2014 | Aerrabotu |
| 2015/0248131 | A1 | 9/2015 | Fairfield et al. |
| 2016/0131753 | A1 | 5/2016 | Brown |
| 2017/0061712 | A1 | 3/2017 | Li et al. |
| 2018/0194353 | A1 | 7/2018 | Kilmurray et al. |
| 2018/0329429 | A1 | 11/2018 | Yamaguchi et al. |

FOREIGN PATENT DOCUMENTS

| | | | |
|---|---|---|---|
| FR | 3030421 | A1 | 6/2016 |
| JP | 2000177552 | A | 6/2000 |
| TW | 201411566 | A | 3/2014 |
| WO | 2005016718 | A1 | 2/2005 |
| WO | 2013011490 | A1 | 1/2013 |

* cited by examiner

SOUND-BASED BRAKE WEAR DETECTION FOR VEHICLE BRAKING SYSTEMS

FIELD

Embodiments relate to systems and methods for detecting wear in a braking system of a vehicle.

SUMMARY

Components of braking systems experience wear during use. For example, brake pads are gradually worn down as they are applied to brake rotors or discs. The application of braking components creates a sound, such as the sound of a brake disc being contacted by a braking pad. As the braking component is repeatedly applied, the braking component experiences wear, and the sound created by the application of the braking component may change.

Accordingly, embodiments provided herein disclose, among other things, systems and methods for detecting wear in a braking system in a vehicle.

One embodiment provides a system for detecting wear in a braking system of a vehicle. In one example, the system includes a microphone and an electronic controller configured to receive an audio signal from the microphone, determine at least one sound characteristic of the audio signal, determine, based upon the at least one sound characteristic, a condition of a braking component of the braking system, generate a notification regarding the condition, and perform at least one selected from the group of sending the notification to a display for output to a user, storing the notification in a memory, and modifying operation of the vehicle.

Another embodiment provides a method for detecting wear in a braking system of a vehicle. In one example, the method includes receiving, with an electronic controller, an audio signal from a microphone; determining, with the electronic controller, at least one sound characteristic of the audio signal; determining, with the electronic controller, a condition of a braking component of the braking system based upon the at least one sound characteristic; generating, with the electronic controller, a notification regarding the condition; and performing, with the electronic controller, at least on selected from the group of sending the notification to a display for output to a user, storing the notification in a memory, and modifying operation of the vehicle.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), one or more programmable logic controllers (PLCs), and various connections (for example, a system bus) connecting the various components.

Figure 1A:
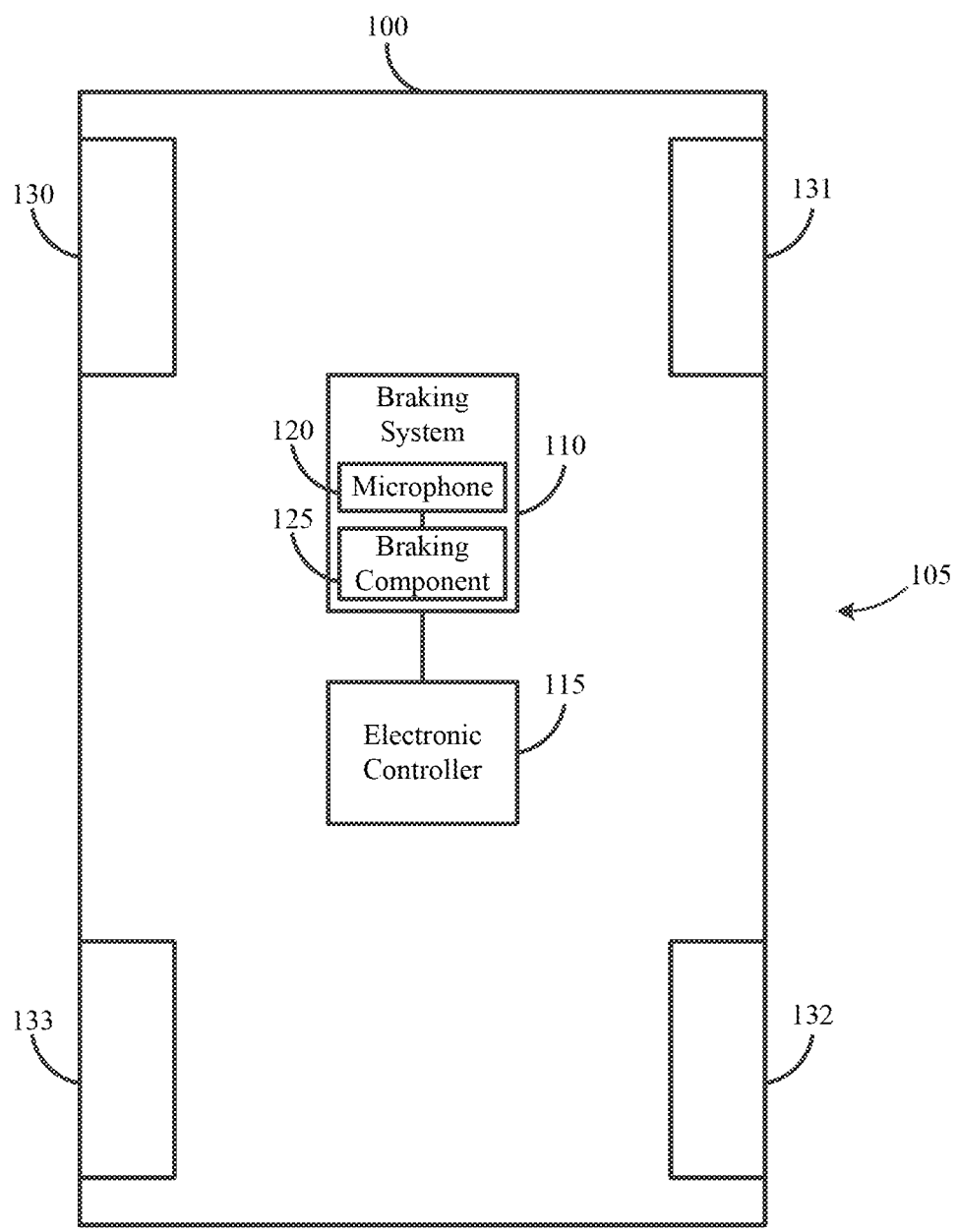
FIG. 1A illustrates a vehicle with a detection system for detecting wear in a braking system according to one embodiment.

FIG. 1A illustrates a vehicle 100 equipped with a detection system 105 for detecting a wear in a braking system 110 according to a first embodiment. The vehicle 100 also includes an electronic controller 115.

In the example shown, the braking system 110 includes a microphone 120 and at least one braking component 125. The braking system 110 is configured to apply the braking component 125 to slow a speed of the vehicle 100. In some embodiments, the braking system 110 receives manual input from an operator of the vehicle 100, such as the operator of the vehicle 100 depressing a brake pedal, in order to apply the braking component 125. In some embodiments, the braking system 110 also includes a braking system electronic controller configured to receive signals to actuate the braking component 125 and further configured to control the actuation of the braking component 125. In other embodiments, the braking system 110 is controlled by the electronic controller 115 or a different electronic controller of the vehicle 100.

The electronic controller 115 is communicatively coupled to the braking system 110 according to one embodiment. In other embodiments, the electronic controller 115 is communicatively coupled to the microphone 120 of the braking system 110. The electronic controller 115 may be communicatively coupled to each of the noted components of the detection system 105 via a dedicated wire, a shared communication link such as a vehicle communication bus (for example, a controller area network (CAN) bus) or a wireless vehicle network.

The microphone 120 is configured to detect a sound of the braking component 125. The detected sound of the braking component 125 is a sound of the at least one braking component 125 in operation. In some embodiments, the microphone 120 is a micro-electrical mechanical system (MEMS) microphone. The microphone 120, in some embodiments, is further configured to generate a signal containing data regarding the detected sound of the braking component 125 and transmit the signal to the electronic controller 115 either directly or through an electronic controller of the braking system 110. In some embodiments, the microphone 120 is comprised of an array of microphones in order to more accurately detect the sound of the at least one braking component 125. For example, each microphone in the array of microphones 120 can be configured to detect a specific frequency range, increasing the accuracy with which the array of microphones 120 can detect specific sounds.

The braking component 125 may be a master cylinder, a piston, a brake caliper, and the like. The braking component 125 is actuated to help slow the speed of the vehicle 100. In one example, the braking component 125 is a master cylinder. A master cylinder in a braking system (such as the braking system 110) contains a piston designed to apply pressure to hydraulic fluid to pressurize fluid that ultimately drives brake calipers and/or brake pads, which create contact with a brake rotor or disc of at least one wheel (for example, one of the wheels 130, 131, 132, and 133) of the vehicle 100 in order to slow the wheels 130, 131, 132, and 133, and thus slow the vehicle 100.

Figure 1B:
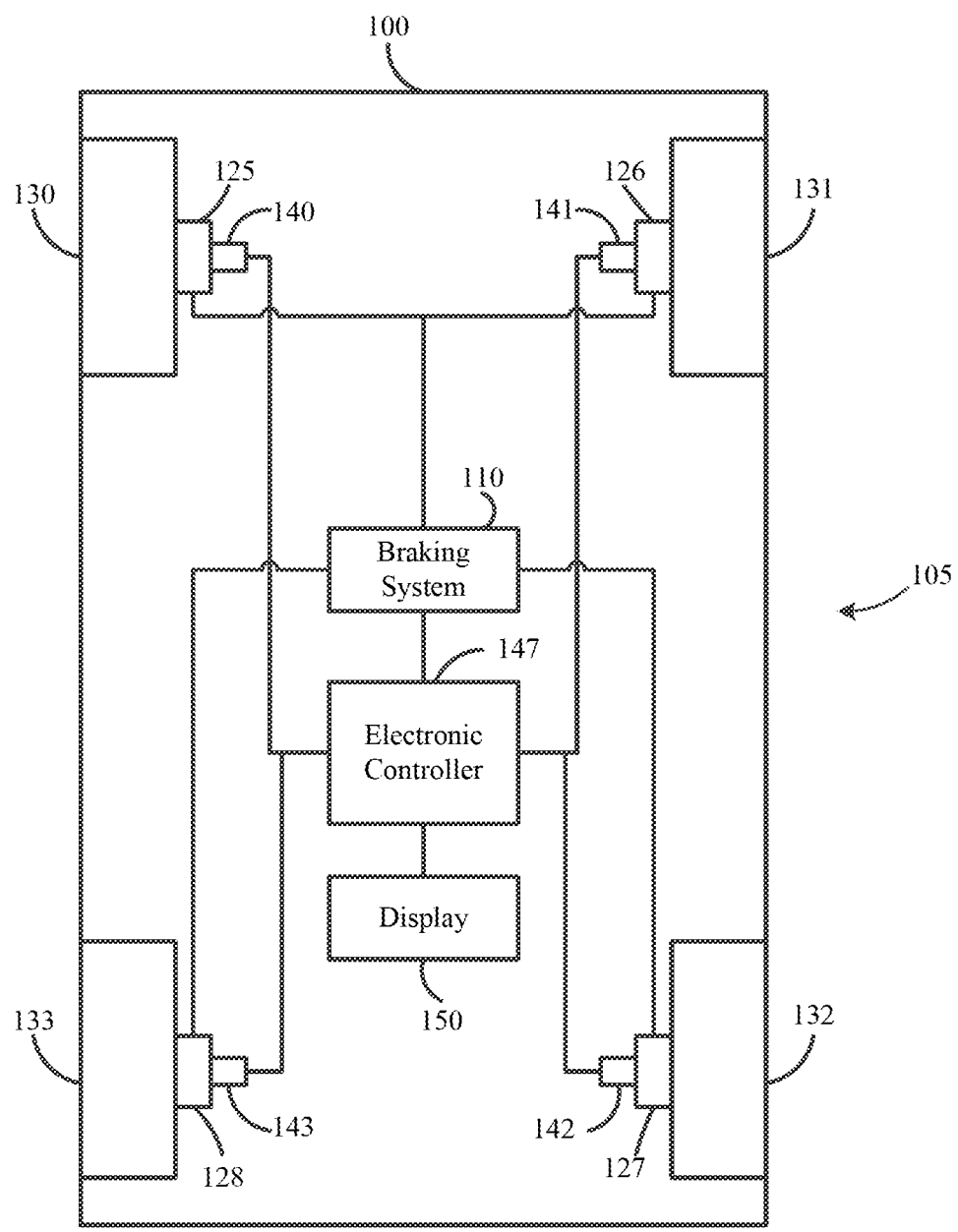
FIG. 1B illustrates a vehicle with a detection system for detecting wear in a braking system according to an alternative embodiment.

FIG. 1B illustrates the vehicle 100 with the detection system 105 for detecting wear in the braking system 110 arranged with a disc brake and brake caliper associated with each of the wheels 130, 131, 132, and 133. In the embodiment shown in FIG. 1B, the detection system 105 includes four microphones 140, 141, 142, and 143, one associated with a respective wheel 130, 131, 132, and 133. The detection system 105 further includes an electronic controller 147.

In the embodiment shown in FIG. 1B, the braking system 110 is similar to the braking system 110 of FIG. 1A, but does not contain the microphone 120. The braking system 110 of FIG. 1B includes the at least one brake component 125, and may also include other brake components 126, 127, and 128. As stated above, these brake components 125, 126, 127, and 128 may be brake calipers, brake pads, and the like associated with each respective wheel 130, 131, 132, and 133.

The electronic controller 147 of FIG. 1B is also similar to the electronic controller 115 of FIG. 1A. However, the electronic controller 147 is communicatively coupled to each of the microphones 140, 141, 142, and 143.

Each microphone 140, 141, 142, and 143 detects a sound of the respective brake component 125, 126, 127, and 128. In some embodiments, only one of the microphones 140, 141, 142, and 143 detects the sound of the respective brake component 125, 126, 127, 128 to transmit to the electronic controller 147. The detected sounds of the brake components 125, 126 127, and 128 are sounds from the brake components 125, 126, 127, and 128 in operation. In other embodiments, more than one of the microphones 140, 141, 142, 143 detect noise from the braking components 125, 126, 127, 128 and transmit the detected sounds to the electronic controller 147.

In the example illustrated in FIG. 1B, the detection system 105 includes a display 150. The display 150 is connected to the electronic controller 147 and displays output of the electronic controller 147. In one example, the display 150 displays a notification generated by the electronic controller 115 to an operator of a vehicle. In one embodiment, the display 150 is a light-emitting diode (LED) present on a dashboard of the vehicle 100. In a further embodiment, the display 150 is contained within a heads-up display on a dashboard of the vehicle 100 (e.g., a heads-up display for radio, a back-up camera, and other general vehicle use may further contain the display 150).

Figure 2:
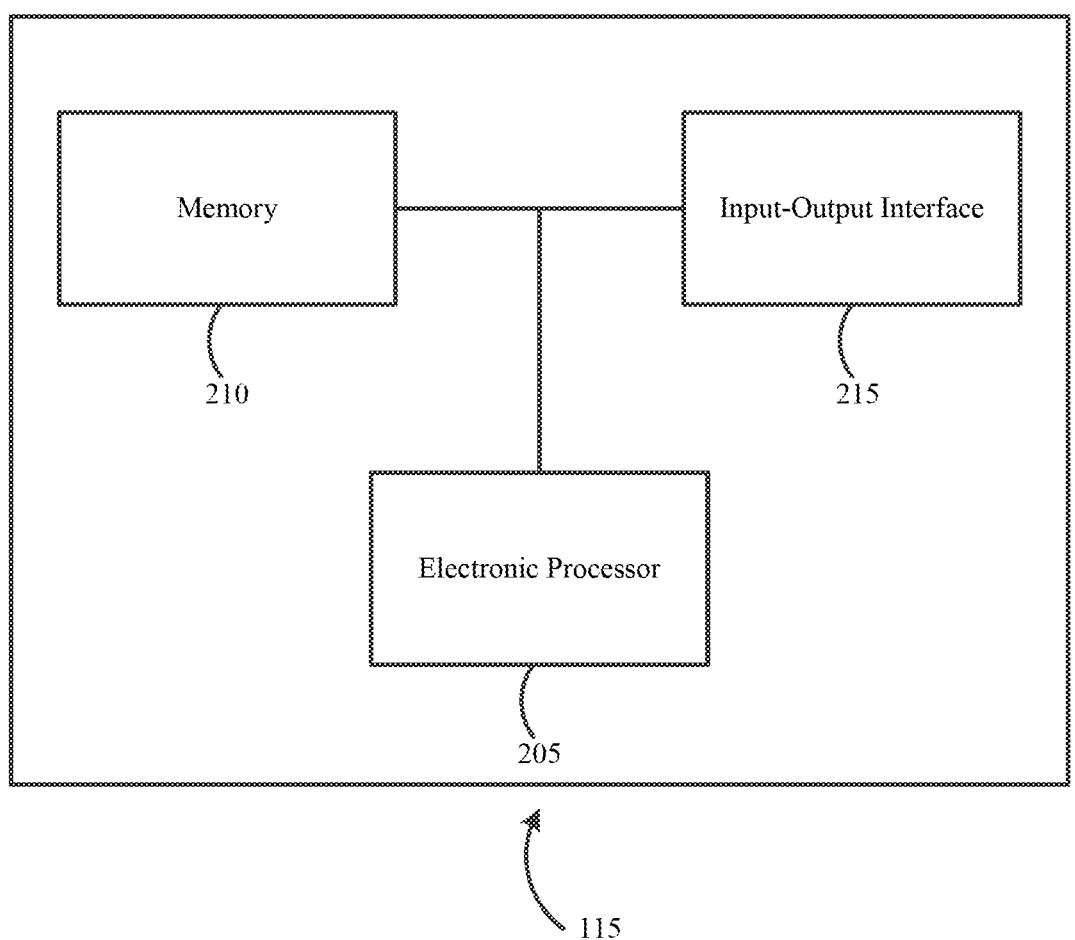
FIG. 2 schematically illustrates an electronic controller according to one embodiment.

FIG. 2 schematically illustrates the electronic controller 115 according to one embodiment. The electronic controller 115 comprises an electronic processor 205, a memory 210, and an input/output interface 215. The electronic processor 205, the memory 210, and the input/output interface 215 communicate over one or more communication lines or buses, wirelessly, or a combination therefore. In some embodiments, the electronic controller 115 includes additional components than those illustrated in FIG. 2 and the components included in the electronic controller 115 may be arranged in various configurations.

The electronic processor 205 may be a microprocessor, an application-specific integrated circuit (ASIC), or another suitable electronic device. In one example, the electronic processor 205 is configured to retrieve data and instructions from the memory 210 and execute, among other things, software related to the processes and methods described herein. The memory 210 includes a non-transitory, computer-readable storage medium.

The input/output interface 215 may be a wireless transceiver, a modem, and the like. The input/output interface 215 is generally configured to receive input from hardware components external from the electronic controller 115 and provide output from the electronic controller 115 to external hardware components.

Figure 3:
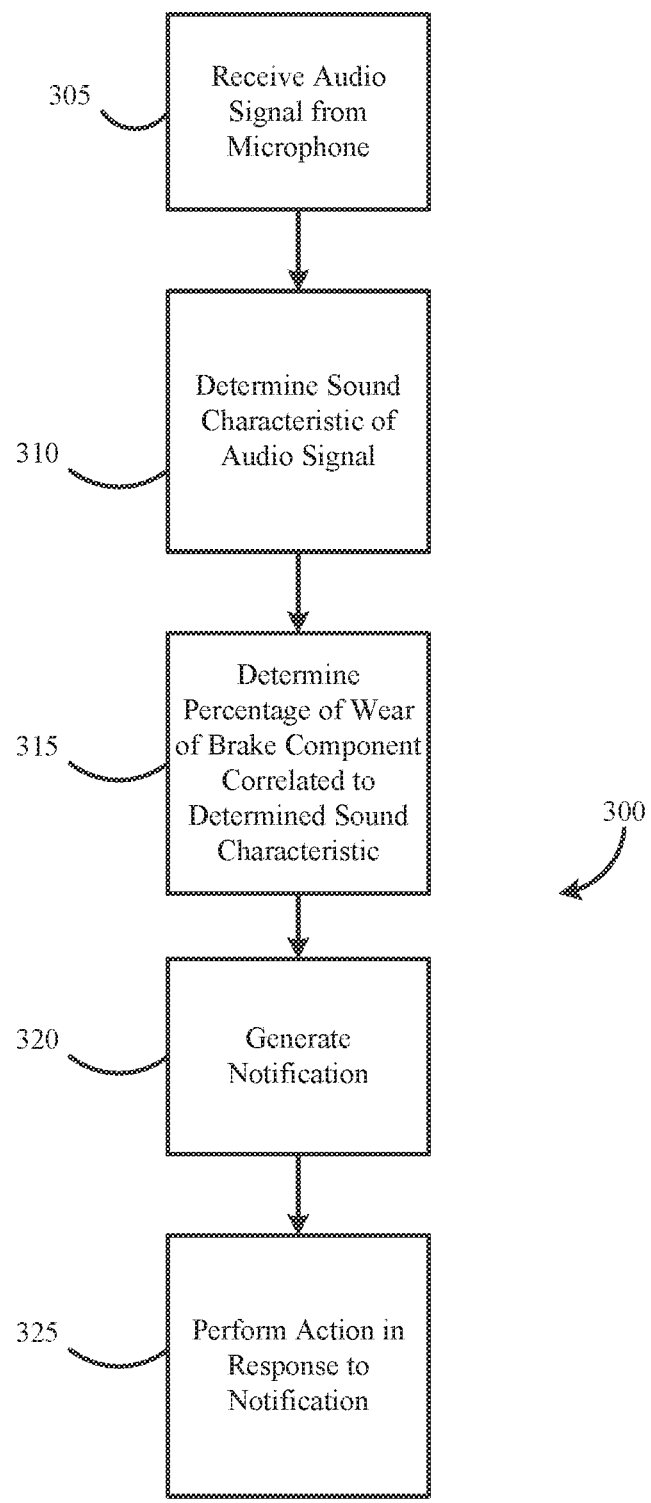
FIG. 3 is a flowchart illustrating a method for detecting wear in a braking system of a vehicle according to one embodiment.

FIG. 3 is a flowchart illustrating a method 300 for detecting wear in the braking system 110 of the vehicle 100 according to one embodiment. In the example provided, the method 300 is performed by the electronic controller 115.

The electronic controller 115 receives an audio signal from the at least one of the microphones 140, 141, 142, and 143 (block 305). The audio signal is generated by the applicable microphone(s) 140, 141, 142, and/or 143 and is based upon a detected sound of a braking component (such as the braking component 125). The detected sound of the braking component 125 may be a noise such as a brake pad contacting a wheel, a master cylinder being actuated, and the like.

In some embodiments, the electronic controller 115 receives multiple audio signals from multiple microphones 140, 141, 142, and 143. In those embodiments, the electronic controller 115 is configured to identify which of the microphones 140, 141, 142, and 143 are sending the signals and generates an identifier for each of the audio signals received. In other embodiments, the microphones 140, 141, 142, and 143 generate a formatted audio signal (as described above) which includes an identifier of one of the microphones. Since the microphone is associated with a braking component 125 (such as a brake disc). The identifier provides an indication to the electronic controller 115 regarding which braking component 125 is generating the detected sound.

The electronic controller 115 receives the audio signal at block 305 and then, at block 310, determines at least one sound characteristic from the received audio signal. In one embodiment, the electronic controller 115 determines an amplitude of the received audio signal as the at least one sound characteristic. In another embodiment, the at least one sound characteristic determined by the electronic controller 115 is a frequency of the received audio signal. In a further embodiment, the electronic controller 115 determines both an amplitude and frequency of the received audio signal. The determined sound characteristic may further be a delay, a harmonic frequency, and the like.

The electronic controller 115 determines the condition of the braking component 125 based upon the determined sound characteristic, at block 315. The electronic controller 115, in one embodiment, compares the sound characteristic to a known sound characteristic. For example, the electronic controller 115 receives an audio signal from a microphone 140 that detects a sound of a brake pad (the braking component 125, in this embodiment). The electronic controller 115 receives the audio signal (block 305) and determines the sound characteristic of the audio signal (at block 310). The electronic controller 115 then compares the amplitude of the audio signal to a known amplitude of the braking component 125 when the braking component 125 is in working or normal condition. If the braking component 125 has suffered wear, the amplitude of the detected sound of the braking component 125 may have a higher value (i.e., is louder) than when the braking component 125 is in working or normal condition. If the electronic controller 115 detects such a change in the detected sound, then the electronic controller 115 determines that the braking component 125 has suffered wear.

In some embodiments, the electronic controller 115 determines an amount of wear that the braking component 125 has suffered. For example, if the sound characteristic is an amplitude, the electronic controller 115 may compare it to a known amplitude of sound for the braking component 125 in normal condition. The electronic controller 115 may determine that the amplitude of the received audio signal is greater (for example, two (2) times greater) than the amplitude of an audio signal of the braking component 125 at normal conditions and determine that the braking component 125 has experienced wear (for example, ten (10) percent) from perfect condition.

In other embodiments, the electronic controller 115 does not determine an exact level of wear of the braking component 125, but is instead configured to determine if the wear is above a threshold. For example, the electronic controller 115 may be configured to receive the audio signal and determine the sound characteristic from a braking pad (the braking component 125). If the amplitude is determined to be above a certain level (e.g., the amplitude determined is 4 decibels and the threshold is 3 decibels) the electronic controller 115 may indicate (via the display 150, as discussed later) that the braking component 125 needs service or replacement.

The electronic controller 115 generates a notification involving the braking component 125 condition at block 320. For example, as described above, the electronic controller 115 may determine that the braking component 125 requires servicing or replacing due to the determined sound characteristic. The electronic controller 115 then generates the notification including, in one embodiment, the determined condition of the braking component 125 (e.g., "Requires replacing") and the name of the braking component 125 (e.g., "Left-front wheel brake pad"). The notification may further include a time and date of the notification, an operator of the vehicle, and the like.

The electronic controller 115 then performs at least one action related to the notification at block 325. The electronic controller 115 may save the notification into the memory 210 for later use, such as being accessed by a service technician during routine maintenance on the vehicle 100 so the service technician may learn that the braking component 125 needs service or replacement.

The electronic controller 115 may also send the notification to the display 150 to display for a user. As discussed above, the display 150 may be an LED configured to be turned on in response to receiving the notification to alert the user that the braking component 125 has experienced wear or needs replacing. In another embodiment, the display 150 is a heads-up display in the vehicle 100 and displays the full notification (e.g., "Left-front brake pad needs replaced due to wear") to the user.

The electronic controller 115 may be further configured to modify operation of the vehicle 100 in response to the generated notification. For example, the electronic controller 115 may determine that a braking pad (the braking component 125) needs replacement. In response, the electronic controller 115 may generate a signal to the braking system 110 to apply more force to the other brake pads (such as the braking components 126, 127, and 128) so the worn-down braking pad (braking component 125) needs less force and therefore undergoes less wear while the brake pad needs replacing. In other embodiments, the electronic controller 115 is configured to increase pressure in the braking system 110 in order to apply more pressure with the braking component 125 because the braking component 125 has suffered wear.

The electronic controller 115 may perform one or more of the above-described actions in response to the generation of the notification. The electronic controller 115 may further be configured to perform other actions, such as sending the notification via a wireless transceiver to a remote location for alerting a user or monitoring by a user. In some embodiments, the electronic controller 115 is configured to send the notification, using a wireless transceiver, to a mobile device located in the vehicle, such as a smartphone, cell phone, tablet computer, laptop computer, and the like. The mobile device is configured to, in some embodiments, receive the notification and then send the notification to a remote location via a wireless communication method.

Therefore, embodiments disclosed herein provide, among other things, systems and methods for detecting wear in a braking system in a vehicle. The systems and methods generally disclose receiving an audio signal from a microphone; determining at least one sound characteristic of the audio signal; determining a condition of a braking component of the braking system based upon the at least one sound characteristic; generating a notification regarding the condition; and performing at least on selected from the group of sending the notification to a display for output to a user, storing the notification in a memory, and modifying operation of the vehicle.

Various features, advantages, and embodiments are set forth in the following claims.

What is claimed is:

1. A system for monitoring brake wear in a braking system of a vehicle, the system comprising:
   a microphone; and
   an electronic controller configured to
      receive an audio signal from the microphone,
      determine a sound characteristic of the audio signal,
      determine, based upon the sound characteristic, a condition of a brake component of the braking system, wherein the condition of the brake component indicates a percentage of wear of the brake component, and wherein the percentage is correlated to the determined sound characteristic,
   generate a notification regarding the condition, and
   perform at least one selected from the group of sending the notification to a display for output to a user, storing the notification in a memory, and modifying operation of the vehicle.

2. The system of claim 1, wherein the sound characteristic is an amplitude.

3. The system of claim 1, wherein the sound characteristic is a frequency.

4. The system of claim 1, the system further comprising a wireless communication device.

5. The system of claim 4, wherein the electronic controller is further configured to generate a signal containing the notification.

6. The system of claim 5, wherein the electronic controller is further configured to send the signal to a remote location via the wireless communication device.

7. The system of claim 5, wherein the electronic controller is further configured to send the signal to a mobile device which is configured to send the signal to a remote location.

8. The system of claim 1, wherein the electronic controller is configured to determine the condition of the brake component by comparing the sound characteristic to a known sound characteristic of the brake component.

9. The system of claim 1, wherein the microphone is configured to receive audio data from the brake component of the braking system.

10. The system of claim 8, wherein the audio signal includes the audio data from the brake component of the braking system.

11. A method for monitoring brake wear in a braking system of a vehicle, the method comprising:
   receiving, with an electronic controller, an audio signal from a microphone;
   determining, with the electronic controller, a sound characteristic of the audio signal;
   determining, with the electronic controller, a condition of a brake component of the braking system based upon the sound characteristic, wherein the condition of the brake component indicates a percentage of wear of the brake component, and wherein the percentage is correlated to the determined sound characteristic;
   generating, with the electronic controller, a notification regarding the condition; and
   performing, with the electronic controller, at least one selected from the group of sending the notification to a display for output to a user, storing the notification in a memory, and modifying operation of the vehicle.

12. The method of claim 11, wherein the sound characteristic is an amplitude.

13. The method of claim 11, wherein the sound characteristic is a frequency.

14. The method of claim 11, the method further comprising sending, via the electronic controller, the generated notification via a wireless communication device to a remote location.

15. The method of claim 11, the method further comprising sending, via the electronic controller, the generated notification via a wireless communication device to a mobile device configured to send the generated notification to a remote location.

16. The method of claim 11, the method further comprising determining the condition of the brake component by comparing the sound characteristic to a known sound characteristic of the brake component.

17. The method of claim 11, the method further including receiving audio data from the brake component with the microphone.

18. The method of claim 17, wherein the audio signal includes the audio data from the brake component of the braking system.

* * * * *